United States Patent Office 3,103,986
Patented Sept. 17, 1963

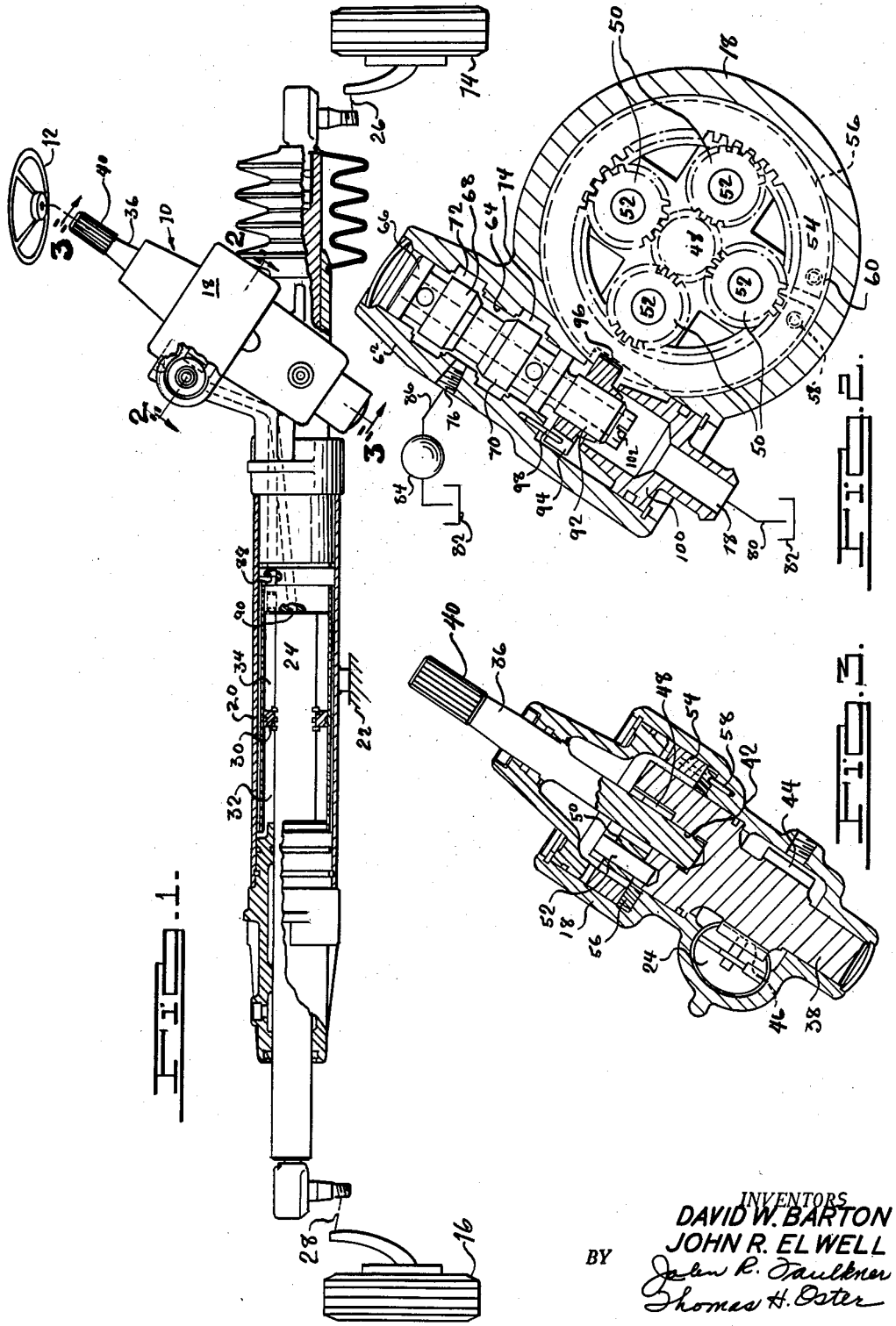

3,103,986
POWER STEERING MECHANISM
David W. Barton, Birmingham, and John R. Elwell, Dearborn, Mich., assignors to Ford Motor Company, Dearborn, Mich., a corporation of Delaware
Filed July 23, 1959, Ser. No. 829,024
9 Claims. (Cl. 180—79.2)

This invention relates generally to power steering mechanisms for motor vehicles, and more particularly to an improved servo valve for use in such a power steering mechanism.

Servo valves for use in power steering mechanisms normally include a pair of relatively moveable valve members which are shiftable to control the application of power, and resilient means for centering the valve elements when no steering effort is being applied.

Two general types of servo valves are in use for power steering. The sliding spool type valve in which the relative movement is linear along the axis of the spool, and the rotary type valve in which the relative movement of the valve parts is angular about the axis of the input or output shaft.

The rotary type of control valve is often favored because of the simple actuating mechanism required, since the input to the steering mechanism is of a rotary nature. However, rotary servo valves have been found susceptible to two serious difficulties. First, high leakage rates, and second, a tendency toward hydraulic bind of the valve spool. On the other hand, the sliding spool control valve is one in which leakage is easily controlled and in which the tendency to hydraulic spool bind is minimized. The greatest difficulty in the use of the linear spool valve is that the rotary input to the steering mechanism must be converted to a linear movement of the valve spool, and the usual motion of converting mechanisms have not been found entirely satisfactory.

In servo valves for power steering, it is important that the valve elements be accurately centered when little or no steering force is being applied to the steering mechanism. It is also important that the resistance to relative motion between the valve elements be uniform regardless of the direction of relative movement. The resilient centering means utilized in the past have been complex and susceptible to misadjustment in service. Further, many of the prior resilient centering devices utilized separate resilient means to resist relative movement of the valve parts in different directions. Any differences between the separate resilient means caused variations in the resistance to relative movement of the valve parts and a difference in the "feel" experienced by the vehicle operator when the steering wheel is turned in different directions.

It is an objective of this invention to provide an improved, rugged, and precise servo valve and actuator for a motor vehicle power steering gear.

Another object is to provide such a servo valve which incorporates the advantages of a sliding spool valve and the simple actuation of a rotary valve.

Still another object is to provide a servo valve which gives identical feel in both directions of operation.

An additional object of this invention is to provide such as servo valve which employ simple, low-cost parts.

Further objects and advantages of the present invention will be apparent from the following description, reference being had to the accompanying drawing wherein a preferred form of the present invention is clearly shown.

In the drawing:

FIGURE 1 is an elevational view, partly in section, and partly schematic, of a power steering mechanism incorporating the present invention.

FIGURE 2 is a sectional view taken on line 2—2 of FIGURE 1.

FIGURE 3 is a sectional view taken on line 3—3 of FIGURE 1.

Referring now to FIGURE 1, there is shown a steering mechanism generally designated 10, which is interposed between the steering wheel 12 and the dirigible wheels 14 and 16 of a motor vehicle. The steering mechanism 10 includes a combined gearing housing and valve body 18 secured to a cylinder 20 that is fixedly mounted on the vehicle frame as shown schematically at 22. A piston rod 24 extends through the cylinder 20 and out the opposite ends thereof to engage steering linkage, schematically indicated at 26 and 28, which is in turn connected to the dirigible wheels 14 and 16, respectively. The piston rod 24 is illustrated as being in the straight-ahead position of the dirigible wheels 14 and 16 and carries a piston 30 which divides the cylinder 20 into a pair of working chambers 32 and 34. It will be apparent that fluid pressure applied to chamber 32 will effect rightward shifting of rod 24 to turn the dirigible wheels 14 and 16 in one direction, and that fluid pressure in chamber 34 will effect steering of wheels 14 and 16 in the opposite direction.

Referring now to FIGURE 3, the housing 18 has rotatably journalled therein an input shaft 36 and an output shaft 38. The input shaft 36 includes a coupling for connection to the steering wheel 12. The inner end of the input shaft 36 is journalled at 42 in a central bore in the output shaft 38. The output shaft 38 includes a pinion gear 44 which engages a rack 46, which is carried on the rod 24 at the right hand thereof, as viewed in FIGURE 1. The input shaft 40 carries at 48 the sun gear of an epicyclic gear train having a plurality of planet gears 50 which are carried on pins 52 mounted in the output shaft 38. A ring gear 54 is positioned in the housing 18. The planet gears 50 engage the ring gear 54 and the sun gear 58 in the usual fashion.

The ring gear 54 is mounted in the housing 18 so as to be rotatable therein. A split-ring spring 56 is located contiguous to the ring 54, encircles the output shaft 38 and is pinned at 58 to the housing 18 and at 60 to the ring gear 54. The spring 56 is so proportioned relative to the housing 18, and the output shaft 38, as to have radial clearance for expansion and contraction as the ring gear 54 rotates a limited amount relative to the housing 18.

The housing 18 includes a projection 62 which forms a valve body having a bore 64 therein. The valve bore 64 is perpendicularly offset with respect to the axes of the input and output shafts 36 and 38, respectively. A valve spool 66 is slidably positioned in the valve bore 64, and includes a pair of lands 68 and 70 which control communication between a pair of motor ports 72 and 74, and a pressure port 76 and a tank port 78. The tank port 78 communicates through a hose schematically indicated at 80 with a reservoir which is schematically shown at 82. A pump 84 withdraws fluid from the reservoir 82 and delivers it through a conduit 86 to the inlet port 76 of the valve body. The valving action of spool 66 is conventional in nature in that shifting it in one direction increases the pressure in motor port 72, while shifting in the opposite direction will increase the pressure in motor port 74. The motor ports 72 and 74 communicate with the working chambers 32 and 34 through passages 88 and 90, respectively, which are drilled in the body 18. The spool 66 includes a threaded portion 92 on which is mounted a collar 94 having a radial extension which engages a slot 96 in the periphery of ring gear 54. A fixed pin 98 extends into a slot in the collar 94 so as to restrain collar 94 against rotation, and yet permit longitudinal movement. A plug 100 carries the outlet connection port 78. With the collar 94 restrained against rotation, the centered position of the valve spool 66 in valve body 62 is readily adjustable by means of a screwdriver inserted through the outlet port 78 to engage the screwdriver in slot 102 into the end of valve spool 66.

In the operation, when there is no steering force exerted on the steering wheel 12 and input shaft 36, the spring member 56 will normally locate the valve spool 66 in the center position illustrated, in which the pressure in motor ports 72 and 74, and consequently in working chambers 32 and 34, are equal. When steering effort is applied to input shaft 36, and that effort is opposed by the normal resistance to turning of dirigible wheels 14 and 16, the reaction of the planet gears 50 on the ring gear 54 will tend to rotate gear 54 relative to the housing 18, thus causing contraction or expansion of the split ring spring 56 depending on the direction of steering effort. It will be apparent from looking at FIGURE 2 that rotation of ring gear 54, relative to housing 18, will cause translation of the valve spool 66 axially of the valve bore 64, thus increasing the fluid pressure in one of the working chambers 32 and 34, and effecting power steering. When the steering effort is relieved, the spring 56 will again center the valve spool 66 and power steering will be terminated.

It should be noted that the generally tangential disposition of the valve bore 64 and the spool 66, relative to the ring gear 54, provides easy screwdriver access through the low pressure return port 78 for adjusting the centered position of the spool 66.

It should also be noted that the arrangement described provides a simple and effective means for converting the rotary input to the steering mechanism to a linear output for shifting a spool-type control valve.

It will also be seen that the resilient centering device is simple, rugged, and resists relative movement of the valve parts with substantially equal force regardless of the direction of movement.

While the form of embodiment of the invention as herein disclosed constitutes a preferred form, it is to be understood that other forms might be adopted, all coming within the scope of the claims which follow.

What is claimed is as follows:

1. In a power steering gear, the combination of: a housing; an epicyclic gear train in said housing having an annular ring gear mounted in said housing for limited rotation, and having sun and planet gears; a single resilient element only engaging said ring gear and said housing restraining said ring gear against rotation; input and output shafts coupled through sun and planet gears; and valve means connected to said ring gear for actuation by said limited rotation.

2. The structure defined by claim 1 which is further characterized in that said single resilient means comprises a split spring ring contiguous to said ring gear and having one end secured to said ring gear and the other to said housing.

3. In a power steering gear, the combination of: a housing; an epicyclic gear train in said housing having an annular ring gear mounted in said housing for limited rotation, and having sun and planet gears; input and output shafts coupled through said sun and planet gears; a linear movement type valve spool disposed in said housing adjacent said ring gear with its longitudinal axis perpendicularly offset with respect to the axis of said ring gear; and coupling means interconnecting said valve spool and said ring gear, said valve spool being threadingly engaged with said coupling means, means positioned within said housing and engaging said coupling means for preventing rotation of said coupling means, said housing having an opening axially aligned with said valve spool, and means on the end of said valve spool for permitting engagement with an adjusting tool whereby relative adjustment between said valve spool and said coupling means may be effected.

4. In a power steering gear, the combination of, a housing, an epicyclic gear train in said housing having an annular ring gear mounted in said housing for limited rotation and having sun and planet gears, resilient means restraining said ring gear against rotation, said resilient means comprising a split spring ring contiguous to said ring gear and having one end secured to said ring gear and the other secured to said housing, input and output shafts coupled through said sun and planet gears, and valve means connected to said ring gear for actuation by said limited rotation.

5. In a power steering gear, the combination of, a housing having a bore positioned therein, an epicyclic gear train positioned in the bore in said housing, said epicyclic gear train having an annular ring gear mounted in said housing for limited rotation and having sun and planet gears, resilient means restraining said ring gear against rotation, said resilient means comprising an annular split spring ring positioned in said bore and having one end secured to said ring gear and the other secured to said housing, said annular split ring spring having a smaller diameter in its unstressed condition than the diameter of said bore, input and output shafts coupled through said sun and planet gears, and valve means coupled to said ring gear for actuation by said limited rotation.

6. A power steering gear comprising, a housing, a bore positioned within said housing, a planetary gear train including a ring gear, a sun gear and planetary gears positioned within said housing, input and output shafts coupled through said sun and planet gears, resilient means restraining said ring gear against rotation, said resilient means comprising an annular split spring positioned in said bore contiguous to said ring gear and around said output shaft, said annular split spring having one end affixed to said ring gear and the other end affixed to said housing, said annular split ring being proportioned relative to the bore in said housing and said output shaft to have radial clearance for expansion and contraction when the ring gear rotates relative to said housing, and valve means coupled to said ring gear for actuation by said ring gear.

7. A power steering gear comprising, a housing, a planetary gear train positioned within said housing, said planetary gear train including a ring gear, a sun gear and planet gears, said ring gear being mounted for limited rotation with respect to said housing, input and output shafts coupled through said sun and planet gears, a spool type valve disposed adjacent said ring gear, and coupling means interconnecting said valve spool and said ring gear, said coupling means threadingly engaging said valve spool to permit adjustment between said valve spool and said coupling upon rotation of said valve spool, means engaging said coupling means and for preventing rotation of said coupling means, one end of said spool valve having means for engaging an adjusting tool whereby adjustment between said valve spool and said coupling means may be effected when said valve spool is rotated by said adjusting tool.

8. A power steering gear comprising a housing, a bore positioned in said housing, a planetary gear train including a ring gear, a sun gear and planetary gears positioned within the bore in said housing, input and output shafts coupled through said sun and planet gears, resilient means restraining said ring gear against rotation, said resilient means comprising an annular split ring positioned in said bore around said output shaft, said annular split ring having an annular surface positioned in engagement with an annular surface of said ring gear, and having one end affixed to said ring gear and the other end affixed to said housing, said annular split ring being proportioned relative to the bore in said housing and said output shaft to have radial clearance for expansion and contraction when the ring gear rotates relative to said housing, and valve means coupled to said ring gear for actuation by said ring gear.

9. A power steering system for an automotive vehicle comprising a pair of dirigible wheels, steering linkage connected to said dirigible wheels, a rack connected to said steering linkage, a hydraulic motor connected to said rack, a steering gear comprising a housing, a planetary gear train positioned within said housing, said planetary gear train including a ring gear, a sun gear and planet gears, said ring gear being mounted for limited rotation with respect to said housing, input and output shafts coupled through said sun and planet gears, a steering wheel connected to said input shaft, a pinion positioned upon said output shaft, said rack being positioned in engagement with said pinion, and control means for controlling said hydraulic motor coupled to said ring gear for actuation by the limited rotation of said ring gear.

References Cited in the file of this patent
UNITED STATES PATENTS

| | | |
|---|---|---|
| 1,330,790 | Dean | Feb. 17, 1920 |
| 1,364,243 | Coldwell | Jan. 4, 1921 |
| 1,586,844 | Rigby | June 1, 1926 |
| 1,630,046 | Anthony et al. | May 24, 1927 |
| 1,854,941 | Kiel | Apr. 19, 1932 |
| 1,874,775 | Marsh | Aug. 30, 1932 |
| 2,031,247 | Bischof | Feb. 18, 1936 |
| 2,105,473 | Dean | Jan. 18, 1938 |
| 2,206,925 | Stout | July 9, 1940 |
| 2,694,384 | Evans | Nov. 16, 1954 |
| 2,732,624 | Smith | Jan. 31, 1956 |
| 2,782,652 | Fletcher | Feb. 26, 1957 |
| 2,784,703 | Davis | Mar. 12, 1957 |
| 2,802,377 | Berthiez | Aug. 13, 1957 |
| 2,844,052 | Stoeckicht | July 22, 1958 |
| 2,870,645 | Tarlton | Jan. 27, 1959 |
| 2,918,981 | Rupp | Dec. 29, 1959 |